(12) United States Patent
Ahn et al.

(10) Patent No.: US 11,524,666 B2
(45) Date of Patent: Dec. 13, 2022

(54) BRAKE DEVICE FOR VEHICLE

(71) Applicant: HYUNDAI MOBIS CO., LTD., Seoul (KR)

(72) Inventors: Sung Ki Ahn, Yongin-si (KR); Soung Jun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 254 days.

(21) Appl. No.: 16/854,148

(22) Filed: Apr. 21, 2020

(65) Prior Publication Data
US 2020/0339087 A1 Oct. 29, 2020

(30) Foreign Application Priority Data

Apr. 26, 2019 (KR) .................. 10-2019-0049126

(51) Int. Cl.
*B60T 8/40* (2006.01)
*B60T 13/14* (2006.01)

(52) U.S. Cl.
CPC .......... *B60T 8/4013* (2013.01); *B60T 8/4022* (2013.01); *B60T 13/142* (2013.01); *B60T 8/4068* (2013.01)

(58) Field of Classification Search
CPC .... B60T 8/4013; B60T 8/4068; B60T 8/4022; B60T 13/142; B60T 13/147; B60T 13/16; B60T 11/28
See application file for complete search history.

(56) References Cited

U.S. PATENT DOCUMENTS

| | | | | |
|---|---|---|---|---|
| 10,894,535 B2* | 1/2021 | Ahn | .................. | B60T 13/146 |
| 2005/0151418 A1* | 7/2005 | Bickel | .................. | B60T 8/4081 |
| | | | | 303/122 |
| 2013/0062932 A1* | 3/2013 | Yagashira | .................. | B60L 7/14 |
| | | | | 303/3 |
| 2015/0375728 A1* | 12/2015 | Kuhlman | .............. | B60T 8/4072 |
| | | | | 303/9.61 |

(Continued)

FOREIGN PATENT DOCUMENTS

| | | |
|---|---|---|
| CN | 106232441 A | 12/2016 |
| KR | 10-2013-0102923 A | 9/2013 |

OTHER PUBLICATIONS

Office Action issued in corresponding Chinese Patent Application No. 202010321557.0 dated Feb. 25, 2022, with English translation.

*Primary Examiner* — Vishal R Sahni
(74) *Attorney, Agent, or Firm* — Morgan, Lewis & Bockius LLP

(57) ABSTRACT

A brake device includes a first flow path unit guiding a braking hydraulic pressure by connecting some of wheel cylinder units and a master cylinder unit; a second flow path unit guiding a braking hydraulic pressure by connecting the others of the wheel cylinder units and the master cylinder unit; a third flow path unit connecting a reservoir and pump units, and connected with the first flow path unit; a fourth flow path unit connecting the reservoir and the pump units, and connected with the second flow path unit; a fifth flow path unit connecting the reservoir and the first flow path unit; a sixth flow path unit connecting the reservoir and the second flow path unit; a seventh flow path unit selectively connecting the first and second flow path units; and an eighth flow path unit connecting the second flow path unit and the reservoir.

11 Claims, 9 Drawing Sheets

(56) References Cited

U.S. PATENT DOCUMENTS

| | | | |
|---|---|---|---|
| 2017/0274879 A1* | 9/2017 | Okochi | B60T 8/4081 |
| 2017/0274884 A1* | 9/2017 | Besier | B60T 13/148 |
| 2018/0162332 A1* | 6/2018 | Nakazawa | B60T 13/686 |
| 2019/0344767 A1* | 11/2019 | Bareiss | B60T 7/12 |
| 2020/0017090 A1* | 1/2020 | Miyoshi | B60T 8/4872 |
| 2020/0017092 A1* | 1/2020 | Ahn | B60T 13/146 |
| 2020/0079337 A1* | 3/2020 | Anderson | B60T 11/20 |
| 2020/0339087 A1* | 10/2020 | Ahn | B60T 8/4022 |

* cited by examiner

BRAKE DEVICE FOR VEHICLE

CROSS-REFERENCE TO RELATED APPLICATION

This application claims priority from and the benefit of Korean Patent Application No. 10-2019-0049126, filed on Apr. 26, 2019, which is hereby incorporated by reference for all purposes as if set forth herein.

BACKGROUND

Field

Exemplary embodiments of the present disclosure relate to a brake device for a vehicle, and more particularly, to a brake device for a vehicle, capable of increasing pump utilization efficiency, minimizing a pulsating amplitude, realizing a pedal simulator function and securing required braking performance.

Discussion of the Background

Recently, hybrid vehicles, fuel cell vehicles, electric vehicles, and the likes have been actively developed to improve fuel efficiency and reduce exhaust gas. These vehicles necessarily require a brake device, that is, a brake device for reducing the speed of or stopping a running vehicle.

A brake device of a conventional electronically controlled brake system includes a vacuum brake which generates a braking force using a suction pressure of an engine or a hydraulic brake which generates a braking force using a hydraulic pressure. In step with the development of a smart safe driving system, an additional function capable of autonomous emergency braking (AEB) upon occurrence of an emergency situation during driving of a vehicle has been developed.

Recently, an ESC (electronic stability control)-integrated brake system, in which ESC capable of active braking is integrated in a conventional brake system (CBS), has been proposed.

The ESC-integrated brake system operates the functions of an anti-lock brake system (ABS), vehicle dynamics control (VDC) and a traction control system (TCS) to secure the stability of the vehicle, when a vehicle's straight-line, cornering and climbing stability decreases during driving of the vehicle.

In order to improve the performance of a brake system, research is being conducted to increase the number of pumps and the capacity of a motor. However, increases in the number of pumps and the capacity of a motor may increase the costs and weight and adversely affect peripheral electric parts (such as an ECU). Therefore, there is a need to solve such a problem.

A background art of the present disclosure is disclosed in Korean Patent Laid-open Publication No. 10-2013-0102923 (published on Sep. 23, 2013 and entitled "Electronic Hydraulic Brake Device").

SUMMARY

Various embodiments are directed to a brake device for a vehicle, capable of increasing pump utilization efficiency, minimizing a pulsating amplitude, realizing a pedal simulator function and securing required braking performance.

In an embodiment, a brake device for a vehicle may include: a first flow path unit configured to guide a braking hydraulic pressure by connecting some of a plurality of wheel cylinder units and a master cylinder unit; a second flow path unit configured to guide a braking hydraulic pressure by connecting the others of the plurality of wheel cylinder units and the master cylinder unit; a third flow path unit configured to connect a reservoir unit which is connected with the master cylinder unit and stores oil, and pump units which are installed to generate a braking hydraulic pressure and be interlocked with one another to alternately perform a suction operation and a discharge operation, and connected with the first flow path unit; a fourth flow path unit configured to connect the reservoir unit and the pump units, and connected with the second flow path unit; a fifth flow path unit configured to connect the reservoir unit and the first flow path unit; a sixth flow path unit configured to connect the reservoir unit and the second flow path unit; a seventh flow path unit configured to selectively connect the first flow path unit and the second flow path unit; and an eighth flow path unit configured to connect the second flow path unit and the reservoir unit.

The first flow path unit may include: an eleventh line part having one end which is connected to the master cylinder unit and the other end which is connected to the third flow path unit, and adjusted in a braking hydraulic pressure by an eleventh valve part; a twelfth line part extending from the eleventh line part, and adjusted in a braking hydraulic pressure by a twelfth valve part; a thirteenth line part configured to connect the twelfth line part and any one of the wheel cylinder units, and adjusted in a braking hydraulic pressure by a thirteenth valve part; and a fourteenth line part configured to connect the twelfth line part and another one of the wheel cylinder units, and adjusted in a braking hydraulic pressure by a fourteenth valve part.

The third flow path unit may include: a thirty-first line part connected with the reservoir unit; a thirty-second line part configured to connect the thirty-first line part and the pump units, and connected with the eleventh line part; a thirty-third line part configured to connect the thirty-first line part and the pump units; and a thirty-fourth line part configured to connect the thirty-third line part and the twelfth line part, and adjusted in a braking hydraulic pressure by a thirty-fourth valve part.

The fifth flow path unit may include: a fifty-first line part connected with the reservoir unit; a fifty-second line part configured to connect the fifty-first line part and the thirteenth line part, and adjusted in a braking hydraulic pressure by a fifty-second valve part; and a fifty-third line part configured to connect the fifty-first line part and the fourteenth line part, and adjusted in a braking hydraulic pressure by a fifty-third valve part.

The second flow path unit may include: a twenty-first line part having one end which is connected to the master cylinder unit and the other end which is connected to the fourth flow path unit, and adjusted in a braking hydraulic pressure by a twenty-first valve part; a twenty-second line part extending from the twenty-first line part, and adjusted in a braking hydraulic pressure by a twenty-second valve part; a twenty-third line part configured to connect the twenty-second line part and any one of the wheel cylinder units, and adjusted in a braking hydraulic pressure by a twenty-third valve part; and a twenty-fourth line part configured to connect the twenty-second line part and another one of the wheel cylinder units, and adjusted in a braking hydraulic pressure by a twenty-fourth valve part.

The fourth flow path unit may include: a forty-first line part connected with the reservoir unit; a forty-second line part configured to connect the forty-first line part and the pump units, and connected with the twenty-first line part; a forty-third line part configured to connect the forty-first line part and the pump units; and a forty-fourth line part configured to connect the forty-third line part and the twenty-second line part, and adjusted in a braking hydraulic pressure by a forty-fourth valve part.

The sixth flow path unit may include: a sixty-first line part connected with the reservoir unit; a sixty-second line part configured to connect the sixty-first line part and the twenty-third line part, and adjusted in a braking hydraulic pressure by a sixty-second valve part; and a sixty-third line part configured to connect the sixty-first line part and the twenty-fourth line part, and adjusted in a braking hydraulic pressure by a sixty-third valve part.

The eighth flow path unit may include: an eighth line part having one end which is connected to the twenty-first line part formed between the master cylinder unit and the twenty-first valve part and the other end which is connected to the reservoir unit; and an eighth valve part formed in the eighth line part, and configured to adjust a braking hydraulic pressure of the eighth line part.

The pump units may be formed in an even number to be interlocked with one another by an eccentric bearing and thereby alternately perform a suction operation and a discharge operation, each pump unit being formed with one flow path which serves as both a suction flow path and a discharge flow path.

A sensor unit which senses an operation of a brake pedal may be installed in the master cylinder unit.

When hydraulic braking is completed, a braking hydraulic pressure of the wheel cylinder units may pass through the pump units and may be then moved to the reservoir unit through the eighth flow path unit.

The brake device for a vehicle according to the embodiments of the disclosure may increase the utilization efficiency of pump units, minimize a pulsating amplitude, realize a pedal simulator function and secure required braking performance.

In the brake device for a vehicle according to the embodiments of the disclosure, since oil returns to a reservoir unit by passing through the pump units when the pressure of wheel cylinder units is reduced, it is possible to prevent air bubbles from accumulating in the pump units and thereby maintain the performance of the pump units.

DETAILED DESCRIPTION OF THE ILLUSTRATED EMBODIMENTS

Hereinafter, a brake device for a vehicle will be described below with reference to the accompanying drawings through various examples of embodiments. It should be noted that the drawings are not to precise scale and may be exaggerated in thickness of lines or sizes of components for descriptive convenience and clarity only. It should be noted that the drawings are not to precise scale and may be exaggerated in thickness of lines or sizes of components for descriptive convenience and clarity only. Therefore, definition of the terms should be made according to the overall disclosures set forth herein.

Figure 1:
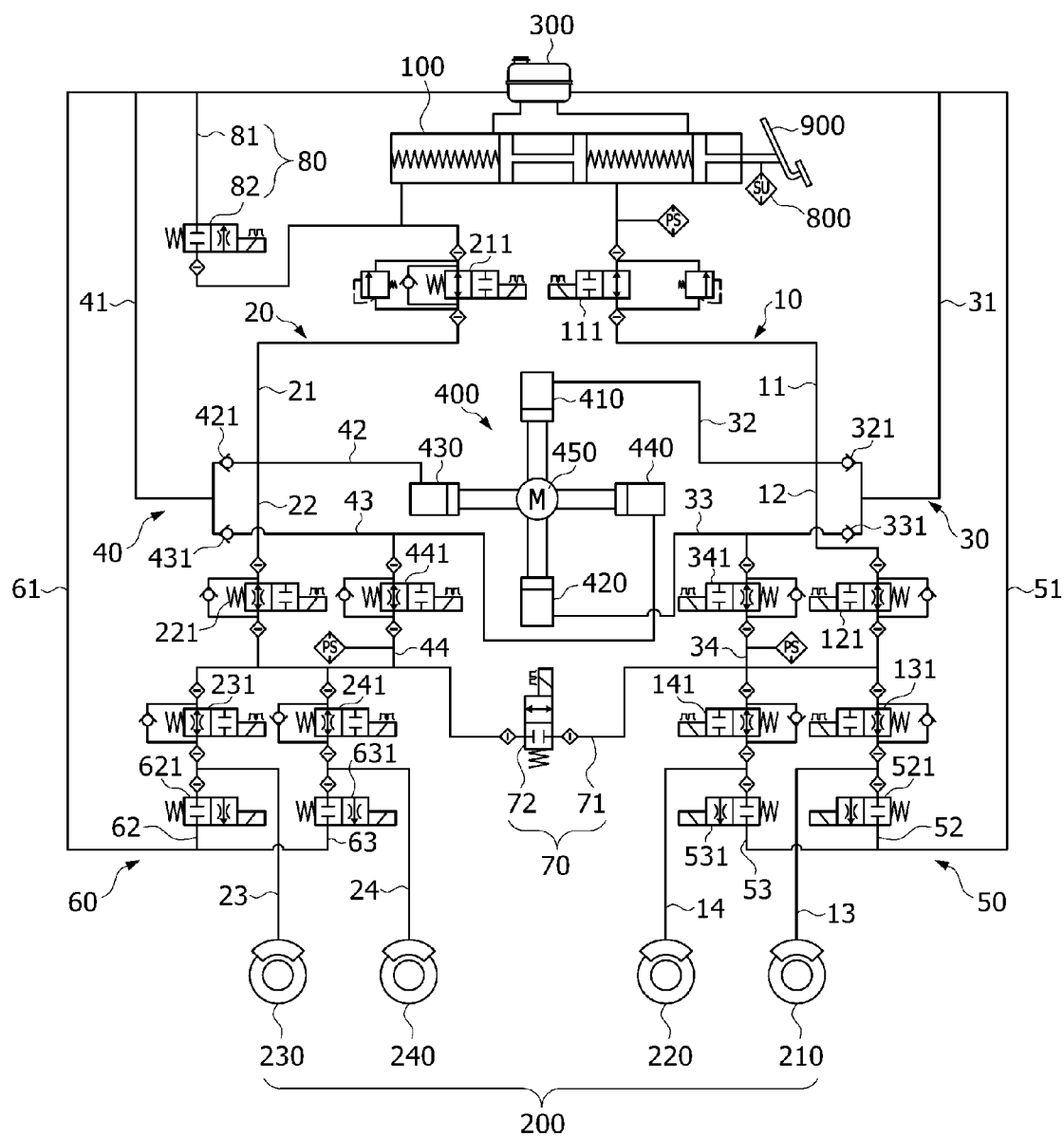
FIG. 1 is a diagram schematically illustrating a representation of an example of a brake device for a vehicle in accordance with an embodiment of the disclosure.

FIG. 1 is a diagram schematically illustrating a representation of an example of a brake device for a vehicle in accordance with an embodiment of the disclosure. Referring to FIG. 1, the brake device for a vehicle in accordance with the embodiment of the disclosure includes a first flow path unit 10 to an eighth flow path unit 80.

The first flow path unit 10 connects a master cylinder unit 100 and some of a plurality of wheel cylinder units 200 to guide a braking hydraulic pressure. For example, the first flow path unit 10 may allow the oil of the master cylinder unit 100 to flow to the wheel cylinder units 200, and, if necessary, may adjust an oil flow rate.

The second flow path unit 20 connects the master cylinder unit 100 and the others of the plurality of wheel cylinder units 200 to guide a braking hydraulic pressure. For example, the second flow path unit 20 may allow the oil of the master cylinder unit 100 to flow to the wheel cylinder units 200, and, if necessary, may adjust an oil flow rate.

The master cylinder unit 100 may generate a braking hydraulic pressure by receiving a pedal force of a brake pedal 900, and may be compartmented into two hydraulic spaces which are connected to the first flow path unit 10 and the second flow path unit 20, respectively.

The wheel cylinder units 200 may include a first wheel cylinder unit 210 to a fourth wheel cylinder unit 240. The first flow path unit 10 may be connected with the first and second wheel cylinder units 210 and 220, and the second flow path unit 20 may be connected with the third and fourth wheel cylinder units 230 and 240.

The third flow path unit 30 connects a reservoir unit 300 which is connected with the master cylinder unit 100 and stores oil, and pump units 400 which are installed to generate a braking hydraulic pressure and be interlocked with one another to alternately perform a suction operation and a discharge operation. The third flow path unit 30 is connected with the first flow path unit 10. For example, the third flow path unit 30 may guide the oil stored in the reservoir unit 300 to flow to the pump units 400.

The fourth flow path unit 40 connects the reservoir unit 300 and the pump units 400. The fourth flow path unit 40 is connected with the second flow path unit 20. For example, the fourth flow path unit 40 may guide the oil, stored in the reservoir unit 300, to flow to the pump units 400, in a state in which the fourth flow path unit 40 communicates with the second flow path unit 20.

The fifth flow path unit 50 connects the reservoir unit 300 and the first flow path unit 10, and the sixth flow path unit 60 connects the reservoir unit 300 and the second flow path unit 20. For example, the fifth flow path unit 50 and the sixth flow path unit 60 may guide the braking hydraulic pressure of the wheel cylinder units 200 to the reservoir unit 300. Due to this fact, a separate accumulator may be omitted.

The seventh flow path unit 70 selectively connects the first flow path unit 10 and the second flow path unit 20, and the eighth flow path unit 80 connects the second flow path unit 20 and the reservoir unit 300. For example, the seventh flow path unit 70 may connect or disconnect a pair of hydraulic circuits, and the eighth flow path unit 80 may alleviate the braking hydraulic pressure of the master cylinder unit 100 by the operation of the brake pedal 900.

The first flow path unit 10 in accordance with the embodiment of the disclosure includes an eleventh line part 11, a twelfth line part 12, a thirteenth line part 13, and a fourteenth line part 14.

The eleventh line part 11 has one end which is connected to the master cylinder unit 100 and the other end which is connected to the third flow path unit 30. An eleventh valve part 111 is formed in the eleventh line part 11 to adjust a braking hydraulic pressure (an oil flow rate).

The twelfth line part 12 extends from the eleventh line part 11. A twelfth valve part 121 is formed in the twelfth line part 12 to adjust a braking hydraulic pressure.

The thirteenth line part 13 connects the twelfth line part 12 and any one of the wheel cylinder units 200, and a braking hydraulic pressure is adjusted by a thirteenth valve part 131. For example, the thirteenth line part 13 may be connected with the first wheel cylinder unit 210.

The fourteenth line part 14 connects the twelfth line part 12 and another one of the wheel cylinder units 200, and a braking hydraulic pressure is adjusted by a fourteenth valve part 141. For example, the fourteenth line part 14 may be connected with the second wheel cylinder unit 220.

The third flow path unit 30 in accordance with the embodiment of the disclosure includes a thirty-first line part 31, a thirty-second line part 32, a thirty-third line part 33, and a thirty-fourth line part 34.

The thirty-first line part 31 is connected with the reservoir unit 300, and the thirty-second line part 32 and the thirty-third line part 33 each are branched from the thirty-first line part 31 and are connected to the pump units 400. The thirty-second line part 32 is connected with the eleventh line part 11. The thirty-fourth line part 34 connects the thirty-third line part 33 and the twelfth line part 12, and a braking hydraulic pressure is adjusted by a thirty-fourth valve part 341. For example, check valves 321 and 331 may be formed in the thirty-second line part 32 and the thirty-third line part 33 for flow control.

The fifth flow path unit 50 in accordance with the embodiment of the disclosure includes a fifty-first line part 51, a fifty-second line part 52, and a fifty-third line part 53.

The fifty-first line part 51 is connected with the reservoir unit 300. The fifty-second line part 52 connects the fifty-first line part 51 and the thirteenth line part 13, and a braking hydraulic pressure is adjusted by a fifty-second valve part 521. The fifty-third line part 53 connects the fifty-first line part 51 and the fourteenth line part 14, and a braking hydraulic pressure is adjusted by a fifty-third valve part 531. For example, the fifty-first line part 51 may be connected with the thirty-first line part 31 or may be directly connected with the reservoir unit 300.

The second flow path unit 20 in accordance with the embodiment of the disclosure includes a twenty-first line part 21, a twenty-second line part 22, a twenty-third line part 23, and a twenty-fourth line part 24.

The twenty-first line part 21 has one end which is connected to the master cylinder unit 100 and the other end which is connected to the fourth flow path unit 40. A twenty-first valve part 211 is formed in the twenty-first line part 21 to adjust a braking hydraulic pressure (an oil flow rate).

The twenty-second line part 22 extends from the twenty-first line part 21. A twenty-second valve part 221 is formed in the twenty-second line part 22 to adjust a braking hydraulic pressure.

The twenty-third line part 23 connects the twenty-second line part 22 and any one of the wheel cylinder units 200, and a braking hydraulic pressure is adjusted by a twenty-third valve part 231. For example, the twenty-third line part 23 may be connected with the third wheel cylinder unit 230.

The twenty-fourth line part 24 connects the twenty-second line part 22 and another one of the wheel cylinder units 200, and a braking hydraulic pressure is adjusted by a twenty-fourth valve part 241. For example, the twenty-fourth line part 24 may be connected with the fourth wheel cylinder unit 240.

The fourth flow path unit 40 in accordance with the embodiment of the disclosure includes a forty-first line part 41, a forty-second line part 42, a forty-third line part 43, and a forty-fourth line part 44.

The forty-first line part 41 is connected with the reservoir unit 300, and the forty-second line part 42 and the forty-third line part 43 each are branched from the forty-first line part 41 and are connected to the pump units 400. The forty-second line part 42 is connected with the twenty-first line part 21. The forty-fourth line part 44 connects the forty-third line part 43 and the twenty-second line part 22, and a braking hydraulic pressure is adjusted by a forty-fourth valve part 441. For example, check valves 421 and 431 may be formed in the forty-second line part 42 and the forty-third line part 43 for flow control.

The sixth flow path unit 60 in accordance with the embodiment of the disclosure includes a sixty-first line part 61, a sixty-second line part 62, and a sixty-third line part 63.

The sixty-first line part 61 is connected with the reservoir unit 300. The sixty-second line part 62 connects the sixty-first line part 61 and the twenty-third line part 23, and a braking hydraulic pressure is adjusted by a sixty-second valve part 621. The sixty-third line part 63 connects the sixty-first line part 61 and the twenty-fourth line part 24, and a braking hydraulic pressure is adjusted by a sixty-third valve part 631. For example, the sixty-first line part 61 may be connected with the forty-first line part 41 or may be directly connected with the reservoir unit 300.

The seventh flow path unit 70 in accordance with the embodiment of the disclosure may include a seventh line part 71 and a seventh valve part 72. The seventh line part 71 connects the twelfth line part 12 and the twenty-second line part 22 to connect two hydraulic circuits, and the seventh valve part 72 may be formed in the seventh line part 71 to open and close the seventh line part 71.

The eighth flow path unit 80 in accordance with the embodiment of the disclosure may include an eighth line part 81 and an eighth valve part 82. The eighth line part 81 has one end which is connected to the twenty-first line part 21 and the other end which is connected to the reservoir unit 300. The one end of the eighth line part 81 may be connected with the twenty-first line part 21 which is formed between the master cylinder unit 100 and the twenty-first valve part 211. The eighth valve part 82 may be formed in the eighth line part 81 to open and close the eighth line part 81. The eighth line part 81 may be connected with the forty-first line part 41 or the sixty-first line part 61 or may be directly connected with the reservoir unit 300.

The pump units 400 in accordance with the embodiment of the disclosure are formed in an even number to be interlocked with one another by an eccentric bearing and thereby alternately perform a suction operation and a discharge operation. Each pump unit 400 is formed with one flow path which serves as both a suction flow path and a discharge flow path.

For example, the pump units 400 may include first and second hydraulic pumps 410 and 420 and third and fourth hydraulic pumps 430 and 440. The first to fourth hydraulic pups 410, 420, 430 and 440 may be connected to be driven by one drive motor 450. The first hydraulic pump 410 may be connected with the thirty-second line part 32, and the second hydraulic pump 420 may be connected with the thirty-third line part 33. The third hydraulic pump 430 may be connected with the forty-second line part 42, and the fourth hydraulic pump 440 may be connected with the forty-third line part 43.

The first and second hydraulic pumps 410 and 420 and the third and fourth hydraulic pumps 430 and 440 may be configured by reciprocating pistons. According to the rotation of the eccentric bearing during one revolution of the driving motor 250, the first and second hydraulic pumps 410 and 420 may alternately perform a suction operation and a discharge operation, and the third and fourth hydraulic pumps 430 and 440 may also alternately perform a suction operation and a discharge operation.

Each of the first and second hydraulic pumps 410 and 420 and the third and fourth hydraulic pumps 430 and 440 is formed with one flow path which serves as both a suction flow path and a discharge flow path, and the plurality of check valves 321, 331, 421 and 431 may be installed such that a braking hydraulic pressure is transferred in a constant direction in each flow path.

Therefore, when the first hydraulic pump 410 or the third hydraulic pump 430 performs a suction operation (a discharge operation), the second hydraulic pump 420 or the fourth hydraulic pump 440 may perform a discharge operation (a suction operation).

As such, since each of the first and second hydraulic pumps 410 and 420 and the third and fourth hydraulic pumps 430 and 440 is formed with one flow path which serves as both a suction flow path and a discharge flow path, there is no need to install separate valves. As a consequence, the number of parts may be reduced, a manufacturing cost reducing effect may be achieved, and a problem of a pulsating phenomenon due to the operations of valves may be solved.

Further, since the first flow path unit 10 and the second flow path unit 20 may be connected by the seventh flow path unit 70, the first and second hydraulic pumps 410 and 420 and the third and fourth hydraulic pumps 430 and 440 may be used in common in the first flow path unit 10 and the second flow path unit 20, and through this, pump utilization efficiency may be increased, and a pulsating amplitude may be minimized.

A sensor unit 800 which senses the operation of the brake pedal 900 is installed in the master cylinder unit 100.

Figure 2:
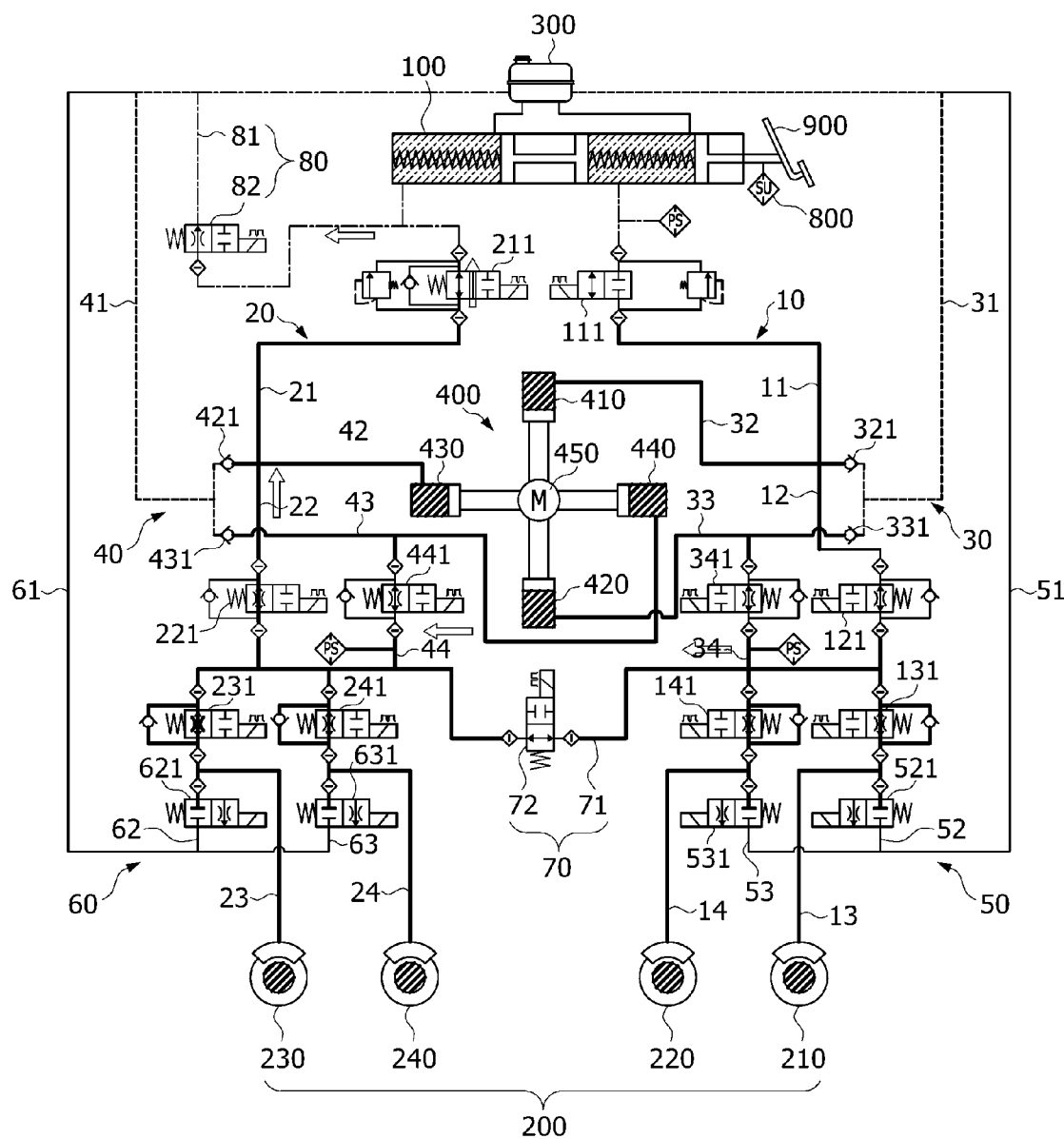
FIG. 2 is a diagram schematically illustrating a representation of an example of a hydraulic pressure moving state after completion of hydraulic braking in the brake device for a vehicle in accordance with the embodiment of the disclosure.

FIG. 2 is a diagram schematically illustrating a representation of an example of a hydraulic pressure moving state after completion of hydraulic braking in the brake device for a vehicle in accordance with the embodiment of the disclosure. Referring to FIG. 2, when hydraulic braking is completed, the braking hydraulic pressure of the wheel cylinder units 200 passes through the pump units 400 and is then moved to the reservoir unit 300 through the eighth flow path unit 80.

That is to say, if general hydraulic braking using the brake pedal 900 is completed, the eleventh valve part 111 closes the eleventh line part 11, and the twenty-first valve part 211 opens the twenty-first line part 21. The twelfth valve part 121 opens the twelfth line part 12, the thirty-fourth valve part 341 opens the thirty-fourth line part 34, the twenty-second valve part 221 opens the twenty-second line part 22, and the forty-fourth valve part 441 opens the forty-fourth line part 44. The seventh flow path unit 70 connects the first flow path unit 10 and the second flow path unit 20, and the eighth valve part 82 opens the eighth line part 81.

In the above state, the oil of each wheel cylinder unit 200 flows to the master cylinder unit 100 and the reservoir unit 300 through the eleventh line part 11. At this time, as oil passes through the first to fourth hydraulic pumps 410, 420, 430 and 440, it is possible to prevent air bubbles from accumulating in the first to fourth hydraulic pumps 410, 420, 430 and 440 and stably maintain pump operation outputs.

Figure 3:
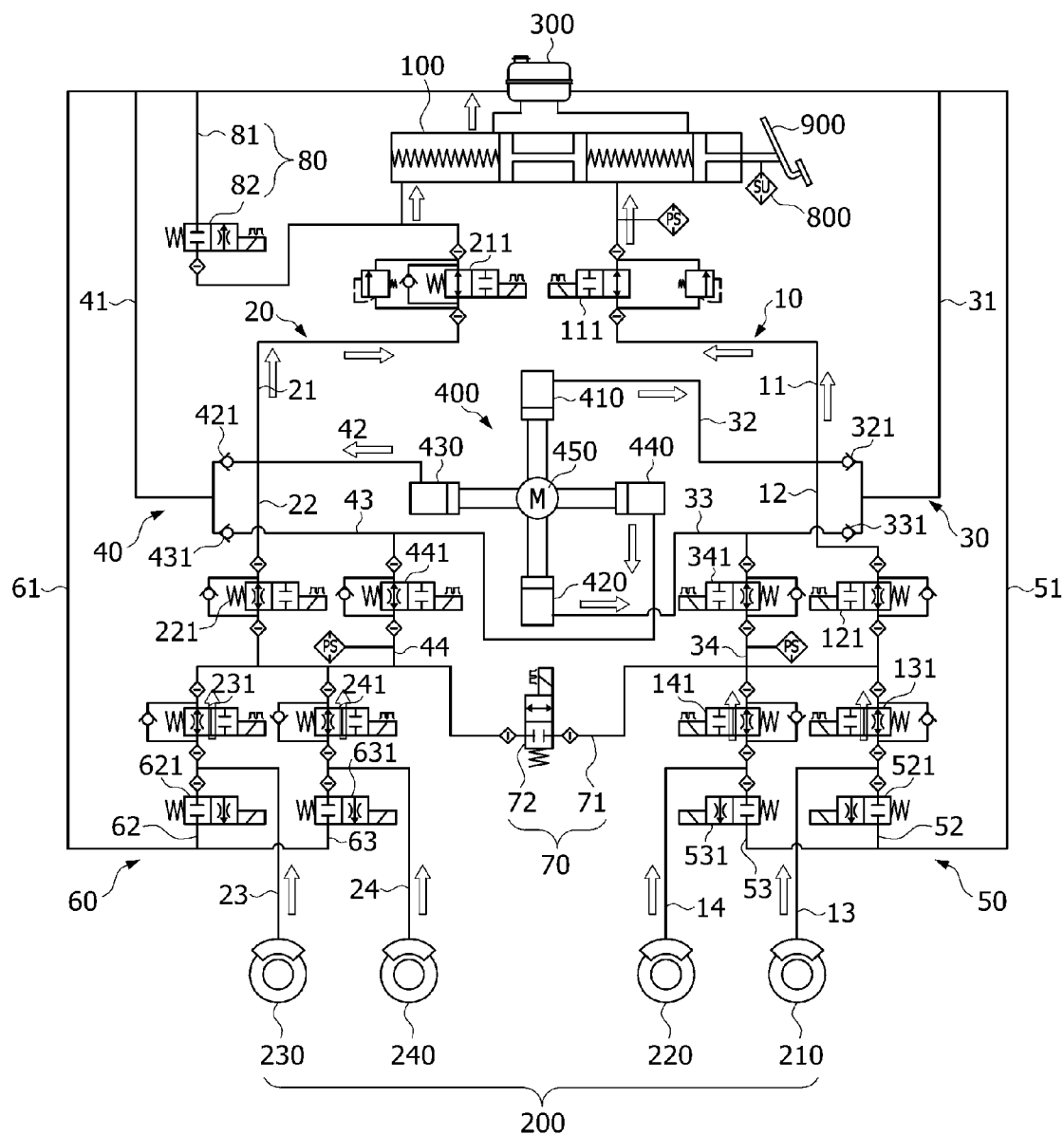
FIG. 3 is a diagram schematically illustrating a representation of an example of an initial bleeding operation state in the brake device for a vehicle in accordance with the embodiment of the disclosure.

FIG. 3 is a diagram schematically illustrating a representation of an example of an initial bleeding operation state in the brake device for a vehicle in accordance with the embodiment of the disclosure. Referring to FIG. 3, in an initial bleeding operation of the hydraulic circuit, the seventh valve part 72 closes the seventh line part 71, and the eighth valve part 82 closes the eighth line part 81. The fluid supplied to the wheel cylinder units 200 passes through the twelfth line part 12, the thirty-fourth line part 34, the twenty-second line part 22 and the forty-fourth line part 44 by the twelfth valve part 121, the thirty-fourth valve part 341, the twenty-second valve part 221 and the forty-fourth valve part 441, respectively, which are normally open valves, and reaches the master cylinder unit 100 and the reservoir unit 300 connected with the master cylinder unit 100. An internal vacuum degree forming and suction time of the pump units 400 may be shortened.

Figure 4:
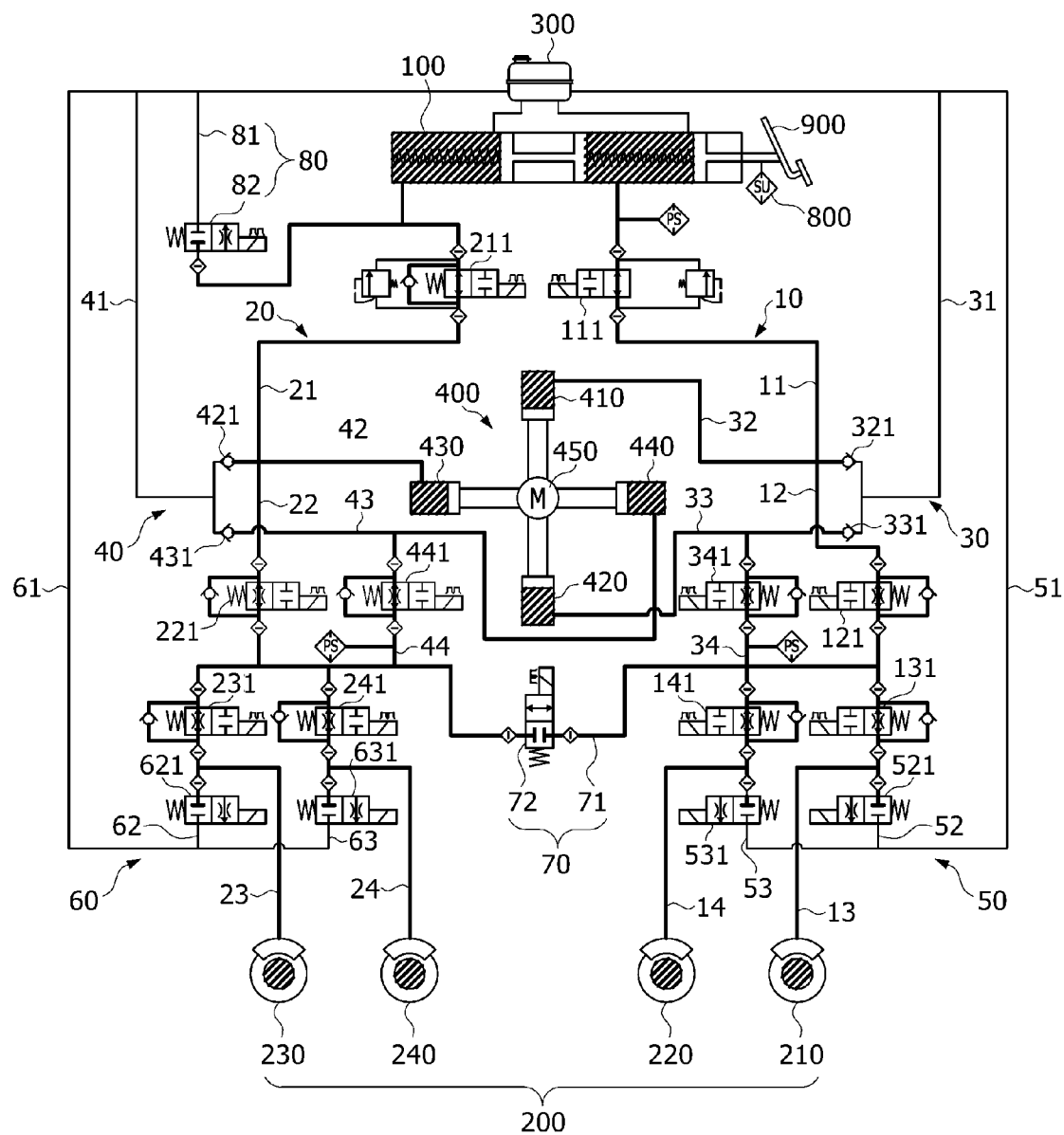
FIG. 4 is a diagram schematically illustrating a representation of an example of a braking state when no power is applied in the brake device for a vehicle in accordance with the embodiment of the disclosure.

FIG. 4 is a diagram schematically illustrating a representation of an example of a braking state when no power is applied in the brake device for a vehicle in accordance with the embodiment of the disclosure. Referring to FIG. 4, in a state in which no power is applied, the seventh valve part 72 closes the seventh line part 71, and the eighth valve part 82 closes the eighth line part 81. If the brake pedal 900 is pressed in this state, the oil stored in the master cylinder unit 100 reaches the respective wheel cylinder units 200 through the first flow path unit 10 and the second flow path unit 20.

Figure 5:
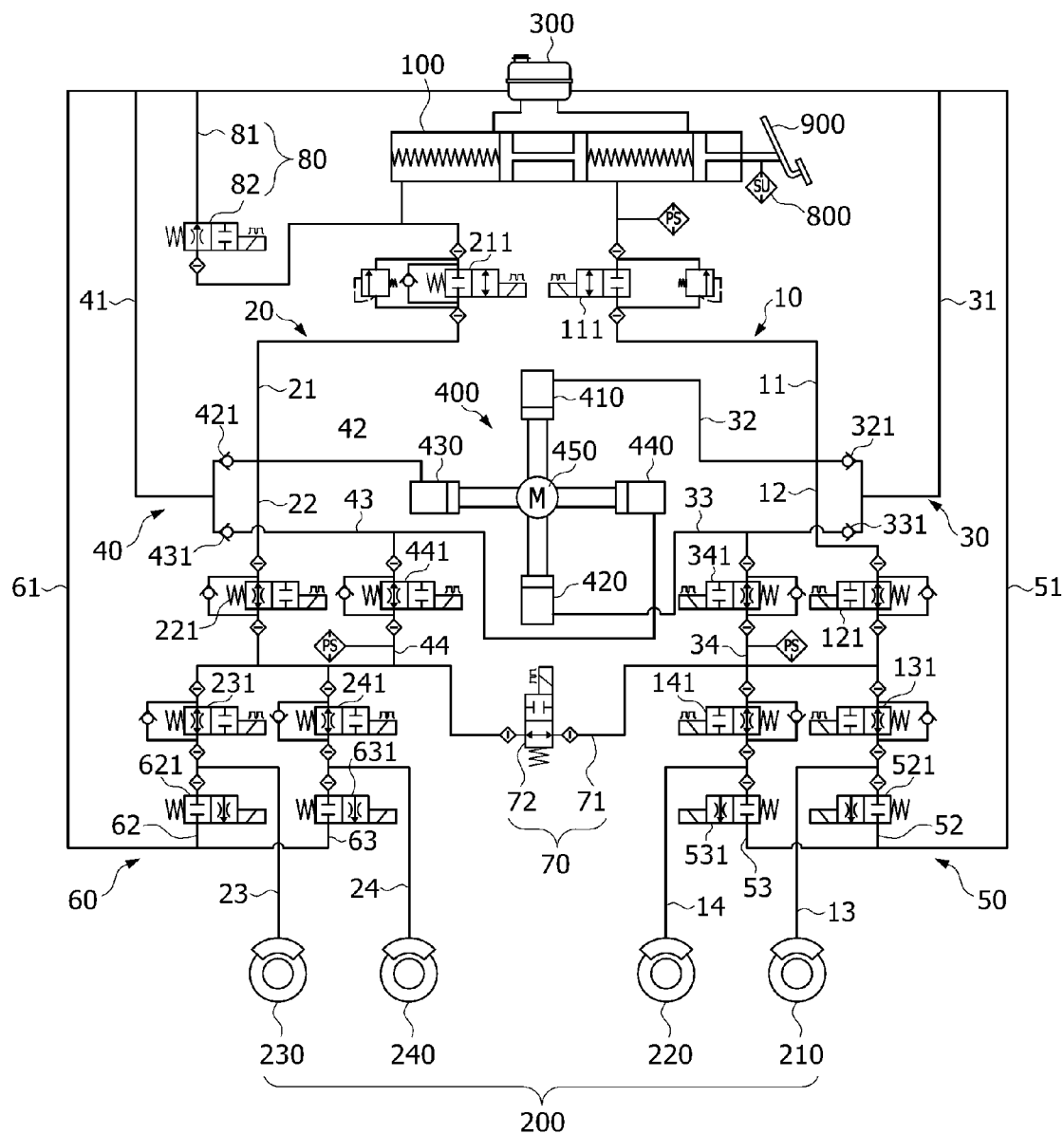
FIG. 5 is a diagram schematically illustrating a representation of an example of a non-braking state when power is applied in the brake device for a vehicle in accordance with the embodiment of the disclosure.

FIG. 5 is a diagram schematically illustrating a representation of an example of a non-braking state when power is applied in the brake device for a vehicle in accordance with the embodiment of the disclosure. Referring to FIG. 5, when power is applied, the seventh valve part 72 opens the seventh line part 71, and the eighth valve part 82 opens the eighth line part 81. The eleventh valve part 111 closes the eleventh line part 11, and the twenty-first valve part 211 closes the twenty-first line part 21.

Figure 6:
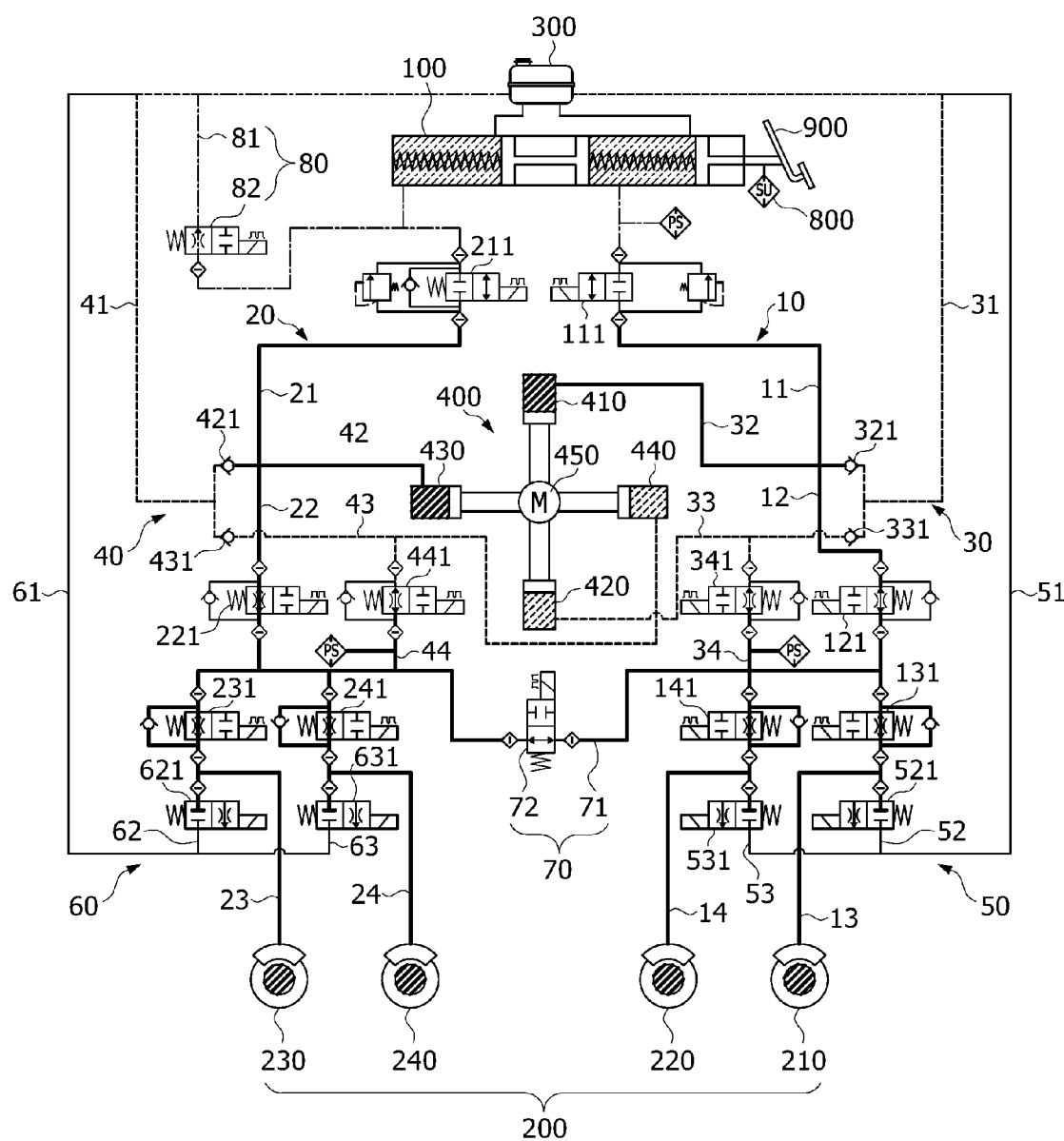
FIG. 6 is a diagram schematically illustrating a representation of an example of a braking state when power is applied in the brake device for a vehicle in accordance with the embodiment of the disclosure.

FIG. 6 is a diagram schematically illustrating a representation of an example of a braking state when power is applied in the brake device for a vehicle in accordance with the embodiment of the disclosure. Referring to FIG. 6, in the case where the sensor unit 800 senses the operation of the brake pedal 900 in the state of FIG. 5, the oil of the master cylinder unit 100 passes through the eighth flow path unit 80 and flows to the reservoir unit 300. The oil supplied from the reservoir unit 300 is forcibly boosted in its pressure by the driving of the pump units 400, and reaches the wheel cylinder units 200. The twelfth valve part 121, the thirty-fourth valve unit 341, the twenty-second valve part 221 and the forty-fourth valve part 441 may be controlled to allow the wheel cylinder units 200 to reach a target set pressure.

Figure 7:
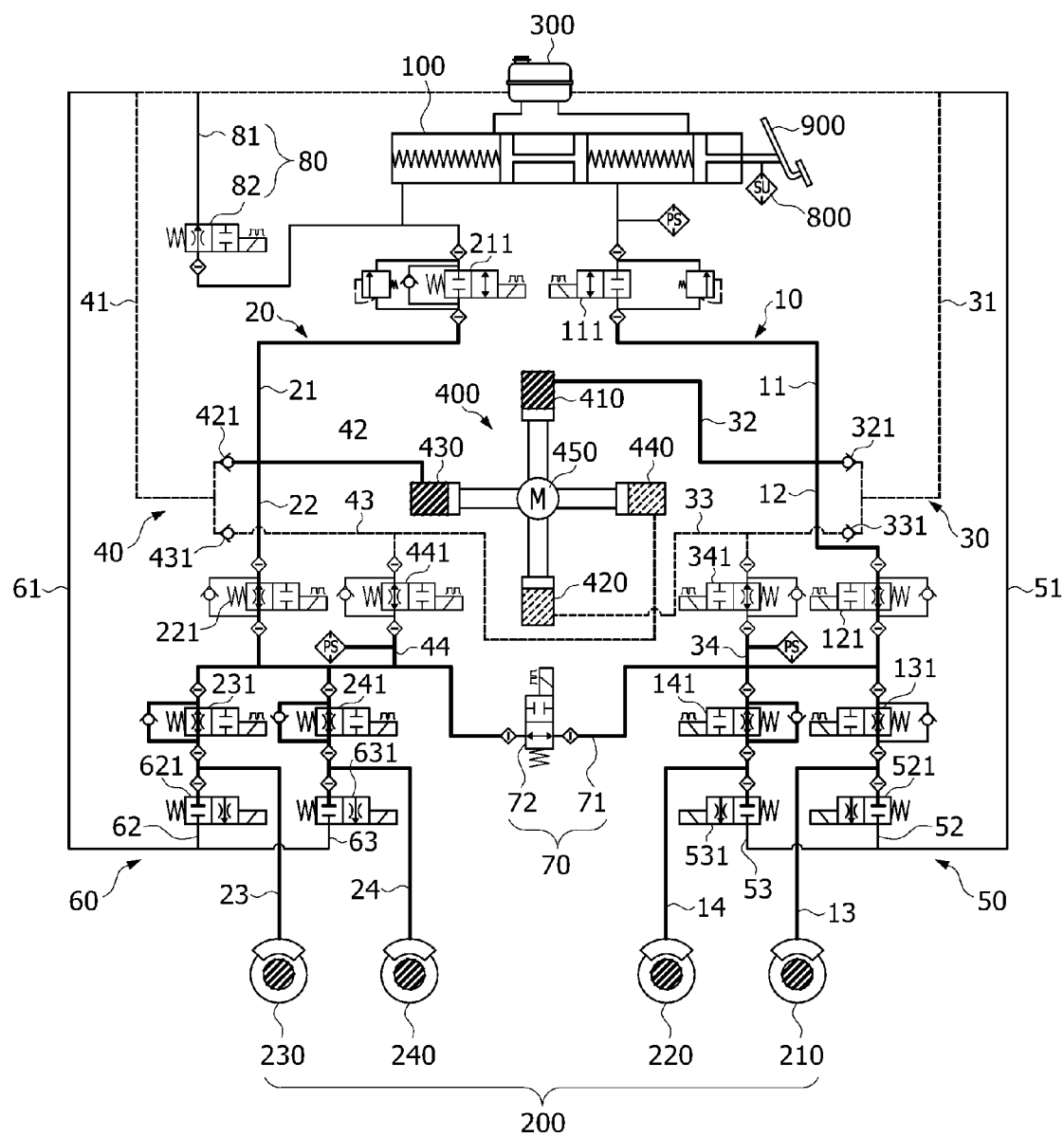
FIG. 7 is a diagram schematically illustrating a representation of an example of an automatic braking state in the brake device for a vehicle in accordance with the embodiment of the disclosure.

FIG. 7 is a diagram schematically illustrating a representation of an example of an automatic braking state in the brake device for a vehicle in accordance with the embodiment of the disclosure. Referring to FIG. 7, in the case where automatic control is performed while the vehicle is driven, the oil supplied from the reservoir unit 300 is forcibly boosted in its pressure by the driving of the pump units 400, and reaches the wheel cylinder units 200. The twelfth valve part 121, the thirty-fourth valve unit 341, the twenty-second valve part 221 and the forty-fourth valve part 441 may be controlled to allow the wheel cylinder units 200 to reach a target set pressure.

Figure 8:
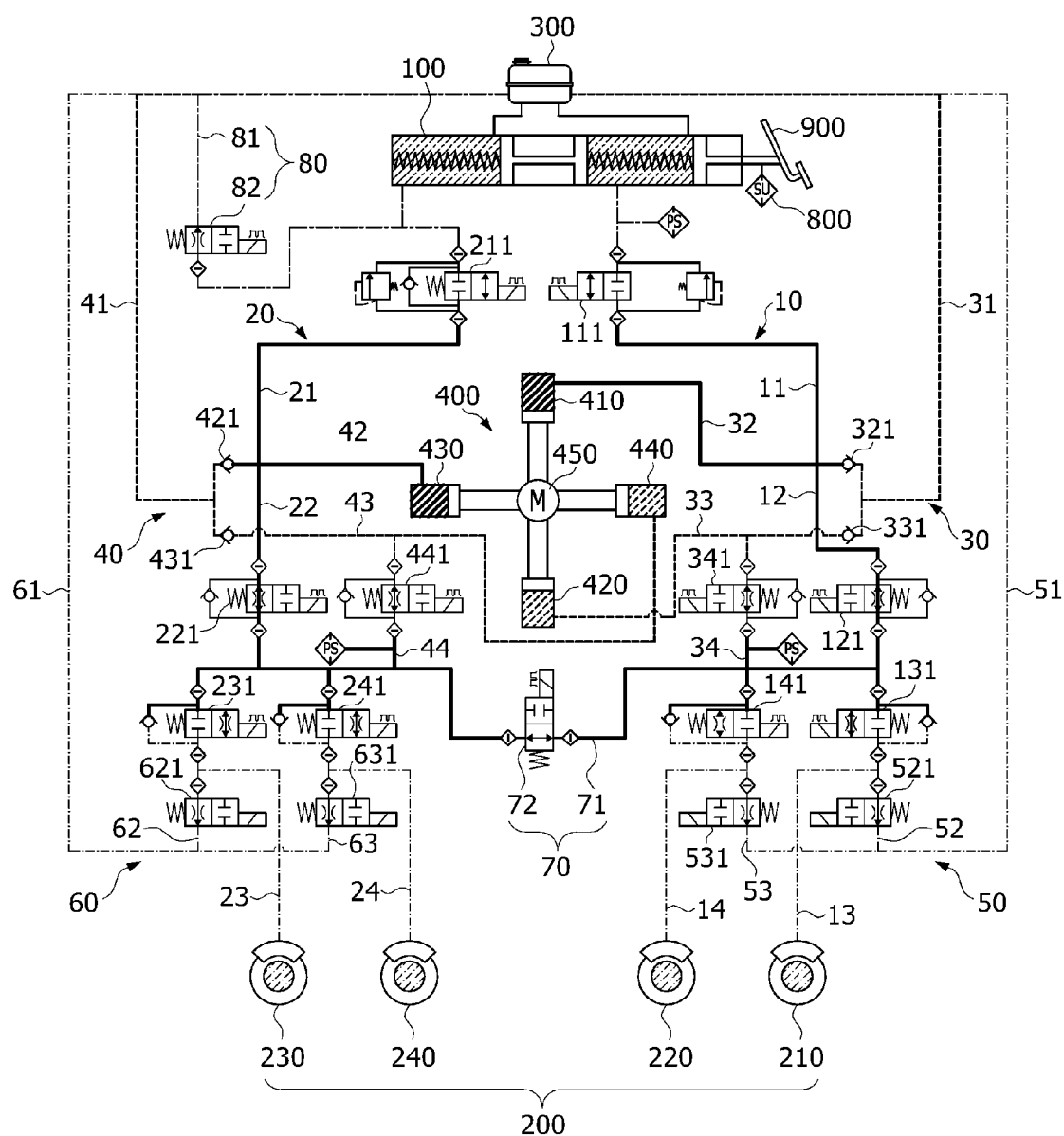
FIG. 8 is a diagram schematically illustrating a representation of an example of an ABS pressure-reducing state in the brake device for a vehicle in accordance with the embodiment of the disclosure.

FIG. 8 is a diagram schematically illustrating a representation of an example of an ABS pressure-reducing state in the brake device for a vehicle in accordance with the embodiment of the disclosure. Referring to FIG. 8, in the case where pressure reduction in the wheel cylinder units 200 is required, the thirteenth valve part 131 closes the thirteenth line part 13, and the fourteenth valve part 141 closes the fourteenth line part 14. The twenty-third valve part 231 closes the twenty-third line part 23, and the twenty-fourth valve part 241 closes the twenty-fourth line part 24. On the other hand, the fifty-second valve part 521 opens the fifty-second line part 52, the fifty-third valve part 531 opens the fifty-third line part 53, the sixty-second valve part 621 opens the sixty-second line part 62, and the sixty-third valve part 631 opens the sixty-third line part 63. Due to this fact, the oil of the wheel cylinder units 200 flows to the reservoir unit 300.

Figure 9:
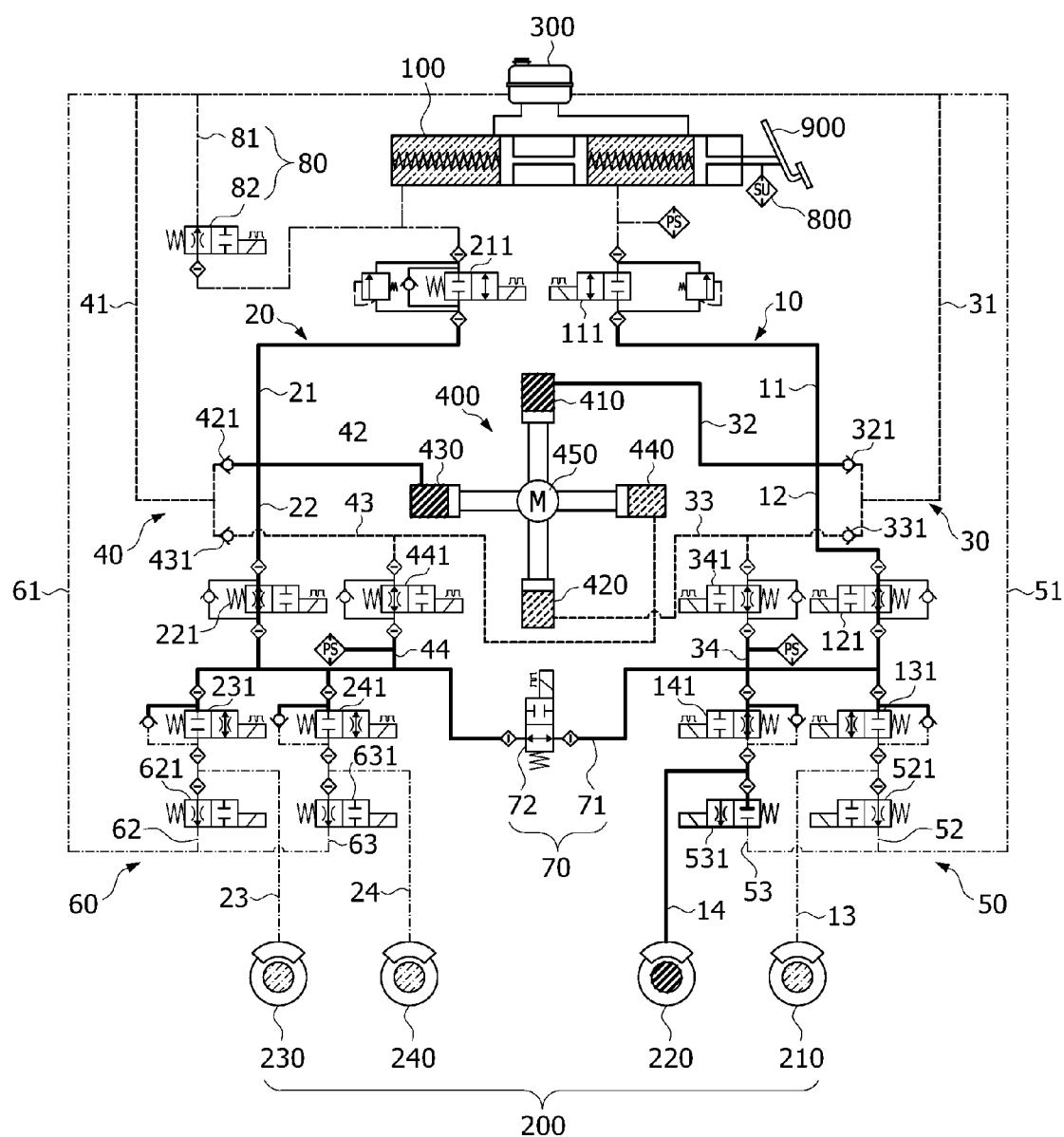
FIG. 9 is a diagram schematically illustrating a representation of an example of an ABS pressure-increasing state in the brake device for a vehicle in accordance with the embodiment of the disclosure.

FIG. 9 is a diagram schematically illustrating a representation of an example of an ABS pressure-increasing state in the brake device for a vehicle in accordance with the embodiment of the disclosure. Referring to FIG. 9, in the case where pressure increase in only the second wheel cylinder unit 220 is required, the oil supplied from the reservoir unit 300 is forcibly boosted in its pressure by the driving of the pump units 400, and reaches the second wheel cylinder unit 220. The fourteenth valve part 141 opens the fourteenth line part 14, and the fifty-third valve part 531 closes the fifty-third line part 53.

As is apparent from the above descriptions, the brake device for a vehicle according to the embodiments of the disclosure may increase the utilization efficiency of the pump units 400, minimize a pulsating amplitude, realize a pedal simulator function and secure required braking performance.

In the brake device for a vehicle according to the embodiments of the disclosure, since oil returns to the reservoir unit 300 by passing through the pump units 400 when the pressure of the wheel cylinder units 200 is reduced, it is possible to prevent air bubbles from accumulating in the pump units 400 and thereby maintain the performance of the pump units 400.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake device for a vehicle, comprising:
   a first flow path unit configured to guide a braking hydraulic pressure by connecting some of a plurality of wheel cylinder units and a master cylinder unit;
   a second flow path unit configured to guide a braking hydraulic pressure by connecting the others of the plurality of wheel cylinder units and the master cylinder unit;
   a third flow path unit configured to connect a reservoir unit which is connected with the master cylinder unit and stores oil, and pump units which are installed to generate a braking hydraulic pressure and be interlocked with one another to alternately perform a suction operation and a discharge operation, and connected with the first flow path unit;
   a fourth flow path unit configured to connect the reservoir unit and the pump units, and connected with the second flow path unit;
   a fifth flow path unit configured to connect the reservoir unit and the first flow path unit;
   a sixth flow path unit configured to connect the reservoir unit and the second flow path unit;
   a seventh flow path unit configured to selectively connect the first flow path unit and the second flow path unit; and
   an eighth flow path unit configured to connect the second flow path unit and the reservoir unit,
   wherein
   the pump units include an even number to be interlocked with one another by an eccentric bearing and alternately perform a suction operation and a discharge operation, a flow path of each pump unit serving as both a suction flow path and a discharge flow path,
   a thirty-first line part of the third flow path unit originates from reservoir unit to be connected to two of the pump units, and a forty-first line part of the fourth flow path unit originates from reservoir unit to be connected to another two of the pump units, and
   the thirty-first line part and the forty-first line part do not overlap each other.

2. The brake device according to claim 1, wherein the first flow path unit comprises:
   an eleventh line part having one end which is connected to the master cylinder unit and the other end which is connected to the third flow path unit, and adjusted in a braking hydraulic pressure by an eleventh valve part;
   a twelfth line part extending from the eleventh line part, and adjusted in a braking hydraulic pressure by a twelfth valve part;

a thirteenth line part configured to connect the twelfth line part and any one of the wheel cylinder units, and adjusted in a braking hydraulic pressure by a thirteenth valve part; and a fourteenth line part configured to connect the twelfth line part and another one of the wheel cylinder units, and adjusted in a braking hydraulic pressure by a fourteenth valve part.

3. The brake device according to claim 2, wherein the third flow path unit comprises:

a thirty-second line part
configured to connect the thirty-first line part and the pump units, and connected with the eleventh line part;

a thirty-third line part configured to connect the thirty-first line part and the pump units; and a thirty-fourth line part configured to connect the thirty-third line part and the twelfth line part, and adjusted in a braking hydraulic pressure by a thirty-fourth valve part.

4. The brake device according to claim 3, wherein the fifth flow path unit comprises:

a fifty-first line part connected with the reservoir unit;

a fifty-second line part configured to connect the fifty-first line part and the thirteenth line part, and adjusted in a braking hydraulic pressure by a fifty-second valve part; and a fifty-third line part configured to connect the fifty-first line part and the fourteenth line part, and adjusted in a braking hydraulic pressure by a fifty-third valve part.

5. The brake device according to claim 1, wherein the second flow path unit comprises:

a twenty-first line part having one end which is connected to the master cylinder unit and the other end which is connected to the fourth flow path unit, and adjusted in a braking hydraulic pressure by a twenty-first valve part;

a twenty-second line part extending from the twenty-first line part, and adjusted in a braking hydraulic pressure by a twenty-second valve part;

a twenty-third line part configured to connect the twenty-second line part and any one of the wheel cylinder units, and adjusted in a braking hydraulic pressure by a twenty-third valve part; and a twenty-fourth line part configured to connect the twenty-second line part and another one of the wheel cylinder units, and adjusted in a braking hydraulic pressure by a twenty-fourth valve part.

6. The brake device according to claim 5, wherein the fourth flow path unit comprises:

a forty-second line part
configured to connect the forty-first line part and the pump units, and connected with the twenty-first line part;

a forty-third line part configured to connect the forty-first line part and the pump units; and a forty-fourth line part configured to connect the forty-third line part and the twenty-second line part, and adjusted in a braking hydraulic pressure by a forty-fourth valve part.

7. The brake device according to claim 6, wherein the sixth flow path unit comprises:

a sixty-first line part connected with the reservoir unit;

a sixty-second line part configured to connect the sixty-first line part and the twenty-third line part, and adjusted in a braking hydraulic pressure by a sixty-second valve part; and a sixty-third line part configured to connect the sixty-first line part and the twenty-fourth line part, and adjusted in a braking hydraulic pressure by a sixty-third valve part.

8. The brake device according to claim 5, wherein the eighth flow path unit comprises:

an eighth line part having one end which is connected to the twenty-first line part formed between the master cylinder unit and the twenty-first valve part and the other end which is connected to the reservoir unit; and an eighth valve part formed in the eighth line part, and configured to adjust a braking hydraulic pressure of the eighth line part.

9. The brake device according to claim 1, further comprising a sensor unit installed in the master cylinder unit to sense an operation of a brake pedal.

10. The brake device according to claim 1, wherein, when hydraulic braking is completed, a braking hydraulic pressure of the wheel cylinder units passes through the pump units and is then moved to the reservoir unit through the eighth flow path unit.

11. The brake device according to claim 1, wherein the even number of the pump units is four or greater.

\* \* \* \* \*